Patented July 8, 1952

2,602,822

UNITED STATES PATENT OFFICE 2,602,822

PRODUCTION OF BIS(HYDROXYPHENYL) COMPOUNDS

Carl G. Schwarzer, Walnut Creek, Seaver A. Ballard, Orinda, and Daniel B. Luten, Jr., Berkeley, Calif., assignors to Shell Development Company, Emeryville, Calif., a corporation of Delaware No Drawing. Application July 23, 1951, Serial No. 238,193

19 Claims. (Cl. 260—619)

This invention relates to the production of bis(hydroxyphenyl) compounds and relates more particularly to the production of hydroxyphenyl-substituted alkanes wherein the nuclei of two phenolic radicals are directly attached to a single carbon atom in the alkyl group. A particular aspect of the invention relates to the production of gem(4-hydroxyphenyl) alkanes.

It is known that hydroxyphenyl-substituted alkanes are obtained by the condensation of a phenol with a carbonyl compound, for example, a ketone. The presence of hydrogen chloride is generally relied upon to accelerate the reaction. Under certain specific operating conditions use has also been made of additional secondary catalytic materials. Developments made heretofore in methods for producing these highly desirable compounds has made possible the attainment of relatively high yields. These methods, however, generally are handicapped by severe difficulties often militating against efficient operation of the process on a commercial scale.

The nature of the starting materials generally employed in processes disclosed heretofore for the production of bis(hydroxyphenyl) compounds unavoidably results in the formation of an aqueous reaction mixture. The maintenance of substantially anhydrous conditions in such processes is therefore generally impossible even though the reactants are introduced into the reaction zone in anhydrous state. Water, it has been found, adversely affects the rate of formation of the desired compounds. To maintain the water content of the reaction mixture produced at a minimum it was generally essential heretofore to introduce materials into the reaction zone in substantially anhydrous state. Since practical operation generally necessitates recycling of unconverted materials comprising, for example, hydrogen chloride and unconverted phenol to the reaction zone, costly and difficult dehydrating procedures must be resorted to.

The unavoidable presence of water, in addition to acidic materials such as hydrogen chloride and phenol, in the reaction mixtures formed in the processes generally available heretofore, seriously complicates the problem of product separation. The corrosive nature of the aqueous reaction mixture often necessitates rapid replacement of apparatus unless use is made of relatively costly materials of construction capable of resisting corrosion. These conditions, directly attributable to the formation of water within the system, adversely affect product quality. Consequently the bis(hydroxyphenyl)-substituted alkanes formed by methods disclosed heretofore are often too discolored and impure to enable their use as starting or intermediate materials in many important fields of application, such as in the production of substantially colorless resins.

It is an object of the present invention to provide an improved process enabling the more efficient production of hydroxyphenyl compounds wherein the above difficulties are obviated to at least a substantial degree and the desired hydroxyphenyl compounds are produced under substantially anhydrous conditions.

Another object of the invention is the provision of an improved process enabling the more efficient production of hydroxyphenyl-substituted alkanes wherein the nuclei of two phenolic radicals are directly attached to a single carbon atom in the alkyl group.

A more particular object of the invention is the provision of an improved process enabling the more efficient production of hydroxyphenyl-substituted compounds comprising gem(4-hydroxyphenyl)-alkanes.

A still more particular object of the invention is the provision of an improved process enabling the more efficient production of hydroxyphenyl-substituted alkanes comprising gem(4-hydroxyphenyl) propane. Other objects and advantages of the invention will become apparent from the following detailed description thereof.

In accordance with the invention hydroxyphenyl-substituted compounds comprising gem-(hydroxyphenyl) compounds are produced by the interaction under acidic conditions of a phenolic compound and an unsaturated organic halide possessing an olefinic linkage between two carbon atoms of aliphatic character and the non-olefinic bonds of one of said olefinically unsaturated carbon atoms are directly attached to a halogen and to a carbon atom of an organic radical.

The class of unsaturated organic halides reacted with a phenolic compound to obtain hydroxy-substituted compounds comprising bis(hydroxyphenyl) alkanes in accordance with the invention is represented by the following empirical formula:

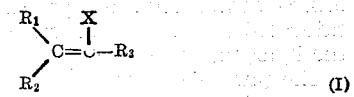

(I)

wherein X is a halogen, $R_1$ and $R_2$ each represent the same or a different member of the group consisting of hydrogen and any monovalent organic radical, aliphatic, cycloaliphatic, aromatic, heterocyclic, including hydrocarbon radicals, such as alkyl, cycloalkyl, aryl, aralkyl, alkaryl, saturated and unsaturated groups, and $R_3$ represents a member of the group consisting of any monovalent organic radical, aliphatic, cycloaliphatic, aromatic, heterocyclic, including hydrocarbon radicals, such as alkyl, cycloalkyl, aryl, aralkyl, alkaryl, saturated and unsaturated groups.

The radical $R_1$ may be joined with the $R_2$ radical and either one of the radicals $R_1$ and $R_2$ may be joined with the radical $R_3$ to form a cyclic nucleus containing one or both of the unsaturated carbon atoms in the nucleus as in alpha-halo-vinylcyclohexane and 1-halocyclohexene, respectively. The radical X in the foregoing formula may be any member of the halogen group. Compounds wherein X is a halogen having an atomic number of from 17 to 35 inclusive, that is chlorine and bromine, are particularly applicable as charge to the process of the invention.

Suitable unsaturated organic halides comprised in the above class comprise the halogenated unsaturated hydrocarbons having at least three carbon atoms to the molecule and containing an olefinically unsaturated carbon atom the non-olefinic bonds of which are directly linked to a halogen and to a carbon atom of a hydrocarbon radical. Examples of such unsaturated hydrocarbon halides are the halo-olefins of open and cyclic structure wherein the halogen atom is attached to an olefinically unsaturated secondary carbon atom, such as 2-halo-propylene, its higher homologues and analogues and substitution products, including:

2-chloropropene
2-bromopropene
2-chlorobutene-1
2-chlorobutene-2
2-bromobutene-1
2-chloro-3-methylbutene-1
1,2-dichlorobutene-2
2-chloropentene-1
2-chloro-3-methylbutene-2
1-phenyl-2-chloropropene-2
2-chlorooctene-1
2-chlorooctene-2
2-chloro-3-phenylpropene-1
1-chlorocyclohexene By "secondary carbon atom" as used in this specification and attached claims is meant a carbon atom which is directly attached to two other carbon atoms. Other suitable unsaturated compounds comprised in the above-defined class containing a halogenated olefinically unsaturated secondary carbon atom are exemplified by the following: alpha-chloro-vinyl-cyclohexane, 2 - chloro - 4 - phenylbutene - 1, 2-chloro-3-cyclohexylpropene, their homologues, analogues and substitution products.

The unsaturated organic halide charge to the reaction may include more than one of the above-defined suitable unsaturated compounds. A suitable charge material for the production of mixed gem(hydroxyphenyl) alkanes are the halo-olefins, containing a halogenated olefinically unsaturated secondary carbon atom, obtained by the halogenation of cracked wax olefins.

The phenolic compounds reacted with an unsaturated organic halide in accordance with the invention comprise the broad class of phenolic compounds having at least one replaceable hydrogen atom directly attached to a nuclear carbon atom of the phenolic radical. By the term "phenolic compounds" as used herein and in the appended claims is meant those organic compounds containing an aromatic radical and one hydroxyl group, said hydroxyl group being linked directly to a carbon atom contained in the nucleus of an aromatic radical. The phenolic compounds, as a class, employed as starting material in the production of bis(hydroxyphenyl) alkanes in accordance with the invention comprise the simplest member of the class, phenol, and the homologues and substitution products of phenol containing at least one replaceable hydrogen atom directly attached to a nuclear carbon atom in the phenolic radical. Suitable phenolic compounds comprise those wherein hydrogen atoms of the aromatic phenolic nucleus have been substituted by hydrocarbon radicals, such as alkyl, cycloalkyl, aryl, alkaryl and aralkyl groups. Suitable phenolic compounds include among others the following: phenol, the cresols, the xylenols, thymol, carvacrol, cumenol, 2-methyl-6-ethylphenol, 2,4-dimethyl-3-ethylphenol, 4-ethylphenol, 2-ethyl-4-methylphenol, 2,3,6-trimethylphenol, 2-methyl-4-tertiary-butylphenol, 2,4-ditertiary-butylphenol, 4-methyl-2-tertiary-butylphenol, 2-tertiary-butyl-4-methylphenol, 2,3,5,6-tetramethylphenols, 2,6-dimethylphenol, 2,6-ditertiary-butylphenol, 3,5-dimethylphenol, 3,5-diethylphenol, 2-methyl-3,5-diethylphenol, o-phenylphenol, p-phenylphenol, the naphthols, phenanthrol, their homologues and analogues. Suitable phenolic compounds comprise those containing more than one phenolic group in each nucleus as well as polynuclear compounds having one or more than one phenolic group in each nucleus. Mixtures of the above compounds may be used as the starting phenolic reactant. Mixtures of phenolic compounds such as found in commercial products, such as cresylic acid, e. g. petroleum cresylic acids and the like may serve as the starting phenolic material of the process within the scope of the invention.

Interaction of the above-defined phenolic compounds with an unsaturated organic halide in accordance with the invention is executed at a temperature in the range of, for example, from about 0° C. to about 120° C., and preferably from about 20° C. to about 80° C. When employing a normally solid starting material as charge, it is generally preferred to employ a temperature at least sufficiently high to melt the charge or to assure more rapid solution of the normally solid component in a solvent or normally liquid component present. The process of the invention has the advantage, due to the absence of any substantial amount of water in the system, of being able to use the higher temperatures in the prescribed permissible temperature range in the absence of substantial adverse effects upon product purity. Subatmospheric, atmospheric, or superatmospheric pressures may be employed. The use of a pressure in the range of from about atmospheric to a superatmospheric pressure of about 100 pounds per square inch is generally preferred. Preferred times of contact will vary to some extent in accordance with the nature of the materials charged and specific operating conditions employed. A contact time ranging from about 15 minutes to about 24 hours, and preferably from about 30 minutes to about 6 hours are satisfactory. Shorter or longer times of contact may, however, be employed within the scope of the invention.

In the process of the invention the phenolic compound may be reacted with the unsaturated organic halide in stoichiometric proportions. The mole ratio of phenolic compound to unsaturated organic halide may range, for example, from about 0.2:1 to about 20:1 and preferably from about 2:1 to about 5:1.

The reaction is preferably executed in the presence of an added acidic catalyst, for example a hydrogen halide, such as hydrogen chloride, preferably in the anhydrous state. The hydrogen chloride may be introduced into the system by presaturation of one or both of the reactants therewith, and/or by its direct introduction into the reaction zone continuously or incrementally during the course of the operation. Relatively small amounts of hydrogen chloride often suffice to speed up materially the reaction rates. The use of hydrogen chloride in amounts ranging from about 1% to about 30% by weight, and preferably from about 3% to about 10% by weight, based upon the theoretical yield of bis(hydroxyphenyl) compound has been found satisfactory. Greater proportions of hydrogen chloride may, however, be employed within the scope of the invention. Maintenance of a desired concentration of hydrogen chloride in the reaction mixture, particularly at higher temperature is facilitated by the use of superatmospheric pressure. Although hydrogen chloride is chosen as a preferred catalytic agent, the invention is in no wise limited to the use of only this acidic agent and any strong mineral acid, for example, phosphoric acid, sulfuric acid, hydrobromic acid, hydrofluoric acid, p-toluene sulfonic acid, or any other acid reacting catalyst, for example, boron trifluoride, boron trifluoride complexes, as well as any material liberating an acid reacting agent under the condition of execution of the reaction may be used within the scope of the invention.

Secondary catalysts may be employed in addition to the acidic agents. Such secondary catalysts comprise, for example, ionizable sulfur compounds, hydrogen sulfide, thiophenols, alkyl-mercaptans, mercapto-substituted aliphatic monocarboxylic acids, and the like. The presence of such secondary catalysts is not essential, however, to efficient execution of the invention. The presence of such secondary catalysts, on the other hand, depending upon the specific material used, often imparts to the product characteristics which it is an express object of the present invention to obviate.

Solvents which are substantially inert under the conditions of execution of the reaction may be present during the reaction. Thus, solvents capable of maintaining all or a portion of the charge or reaction products in solution or in the form of a fluid slurry under the conditions of operation may be used. The phenolic component of the charge may, if desired, be added in sufficient excess to function as a solvent for normally solid charge components or for reaction products in those cases where the presence of any substantial amount of these materials in solid form is not desired. Other solvents which may be employed comprise, for example: benzene, toluene, chlorobenzene, carbon tetrachloride, paraffinic hydrocarbons, etc. The solvent may also function as a means for introducing all or a part of the acid-acting catalyst or of a reactant into the reaction zone.

Under the above-defined conditions the phenolic compounds react with the above-defined unsaturated organic halides, to form a reaction mixture comprising hydroxyphenyl-substituted organic compounds including hydroxyphenyl-substituted alkanes wherein the nuclei of two phenolic radicals are directly attached by carbon-to-carbon linkage to a same single carbon atom in the alkyl group as represented by the following formula:

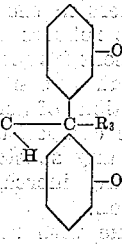

(II)

wherein each $R_1$ and $R_2$ is the same or a different member of the group consisting of hydrogen and monovalent organic radicals including hydrocarbon radicals, such as alkyl, cycloalkyl, aryl, alkaryl and aralkyl which may be saturated or unsaturated, and $R_3$ is a member of the group consisting of monovalent organic radicals including hydrocarbon radicals such as alkyl, cycloalkyl, aryl, alkaryl and aralkyl which may be saturated or unsaturated. The phenolic radicals of the product bis(hydroxyphenyl)methanes represented by Formula II above may be further substituted by suitable hydrocarbon radicals such as alkyl, aryl, cycloalkyl, aralkyl and alkaryl. In the Formula II, each of the phenolic radicals will correspond to the phenolic radical obtained by the removal of hydrogen from a nuclear carbon atom of the phenolic compound from which the product bis(hydroxyphenyl)alkane is derived. By selecting as the phenolic starting material a specific alkyl-substituted phenol, hydroxyphenyl-substituted compounds comprising bis(hydroxyphenyl)alkanes are obtained by the means of the present invention having specific alkyl-substituted phenolic radicals which correspond to the alkyl-substituted phenolic radical obtained by the removal of a hydrogen atom from a nuclear carbon atom which is in the ortho or para position of the phenol nucleus of the phenolic compound used as starting material. The reaction products obtained will generally comprise isomeric forms of the bis(hydroxyphenyl)-alkane. Thus, the interaction of an unsubstituted phenol with a secondary halo-olefin of the above-defined class will generally result in a reaction mixture comprising a mixture of bis(4-hydroxyphenyl)alkane and bis(2-hydroxyphenyl)alkane in which the former will generally greatly predominate. When employing as the phenolic charge to the reaction of the invention a mixture of two or more phenolic compounds the resulting reaction mixture will comprise compounds wherein the phenolic nuclei of two phenolic radicals of different structure are directly attached to a single carbon atom. The two phenolic radicals of different structure attached to a common carbon atom will correspond to the phenolic radicals obtained by the removal of a hydrogen atom from an ortho or para nuclear carbon atom in the phenolic nucleus of two different phenolic compounds in the mixture used as phenolic starting material.

The bis(hydroxyphenyl)alkanes, or crude reaction products comprising them, produced in accordance with the present invention, are of value as starting or intermediate materials in the production of an extensive array of products comprising, for example, chemical derivatives, pharmaceuticals, resins, plastics, paints, lacquers, varnishes, insecticides, adhesives, textile printing compounds, etc. They are of value as antioxidants and stabilizers in a wide field of application including motor fuels, resins, rubber, synthetic rubbers, plastics and many chemical products. Members of the group lend themselves to use as plasticizers in the processing of natural and synthetic rubbers, resins, plastics and the like. The present invention is of particular value in that it makes possible the efficient and economical productions of gem(hydroxyphenyl)-alkanes of specific composition in a high state of purity free of any substantial discoloration thereby substantially increasing their field of practical application.

Products of value with respect to particular fields of application are obtained by the use as phenolic charge material of a compound selected from the group consisting of phenol and the alkyl-substituted phenols in which the substituent alkyl groups contain from 1 to 12 carbon atoms, and preferably from 1 to 7 carbon atoms. Products of particular value in certain specific fields of application include those which are obtained when starting with phenol and with alkyl-substituted phenols wherein alkyl substituent groups contain from 4 to 7 carbon atoms and are linked to the phenolic nucleus through a tertiary carbon atom in the substituent alkyl group.

The specific unsaturated organic halide employed as starting material will depend upon the specific bis(hydroxyphenyl)alkane desired and may be governed to some extent by specific operation conditions employed. Particularly suitable compounds comprised in the above-defined unsaturated organic compounds comprise the suitable halo-olefins having from 3 to 14 carbon atoms to the molecule wherein a halogen atom is attached to an olefinically unsaturated secondary carbon atom.

It is to be understood that such reference to preferred sub-groups of compounds within the broad class of permissible starting materials is in no wise made with intent to limit the scope of the present invention, and that the process of the invention is applicable to the use as starting materials of the suitable class of phenolic compounds and unsaturated organic halides set forth broadly herein.

The process of the invention may be executed in batch, semi-continuous, or continuous operation. The reaction may be carried out in any suitable type of apparatus comprising a reaction zone enabling intimate contact of reactants and maintenance of the reaction conditions. The reaction zone employed may comprise a zone of enlarged cross-sectional area, such as, for example, a reaction chamber, or autoclave, and/or a zone of restricted cross-sectional area such as, for example, a tubular reactor or coil, the outside surface of which is preferably in contact with a heat controlling medium. Suitable means are provided for maintaining reactants in intimate contact with each other. Reaction chambers may be provided with suitable stirring means, or the reaction mixture may be maintained in a state of agitation by provision of suitable means for maintaining a circulating stream thereof through the reaction zone. Due to the absence of any substantial amount of water in the system, readily available and less costly materials of construction, such as, for example, carbon steels, may be employed in apparatus suitable for carrying out the process of the invention.

The reaction mixture produced, comprising the bis(hydroxyphenyl)alkane, is passed from the reaction zone into a suitable product separating zone. The reaction mixture will generally comprise in addition to the desired gem(hydroxyphenyl)alkanes, unconverted reactants, catalyst, and by-products including hydrogen halide. Sometimes included in such by-products will be mono-hydroxyphenyl-substituted compounds and saturated dihalogen-substituted organic compounds. When employing a secondary halogenated olefin as unsaturated organic halide charge the reaction mixture obtained will comprise dihalo-substituted alkanes. Thus, when using 2-chloropropene as a charge component the reaction mixture contains 2,2-dichloropropane in amounts which can be varied by change in operating conditions. The absence of any substantial amount of water in the reaction mixture, however, renders relatively easy the process of product separation which may comprise one or more such steps as, for example, stratification, decantation, distillation, fractionation, solvent extraction, extractive distillation and the like. Unconverted reactants such as, for example, phenolic charge material, and residual acidic agent, such as hydrogen chloride, which are separated from the reaction mixture may be returned to the reaction zone.

The following examples are illustrative of the invention.

EXAMPLE I

To five moles of phenol there was added 1 mole of 2-chloropropene and 0.25 mole $H_2SO_4$ (98%). The mixture was stirred for a period of two hours at a pressure of 2.5 pounds gauge while at a temperature ranging from 34° to 53.5° C. The resulting reaction mixture was cooled to room temperature and crystalline material separated therefrom by filtration. The crystalline product separated by filtration was washed with water and then distilled to a kettle temperature of about 200° C. at 14 mm. The distillation bottoms consisted essentially of 2,2-bis(4-hydroxyphenyl)propane melting in the temperature range of 156–157° C. A conversion of 33.3% to 2,2-bis(4-hydroxyphenyl)propane based on 2-chloropropene charged was obtained.

EXAMPLE II

A mixture containing 1.5 moles 2-chloropropene and 1 mole phenol was stirred at room temperature for a period of 4 hours under a pressure of 2.5 pounds gauge. Anhydrous hydrogen chloride was added intermittently during the operation. The reaction products were filtered. The crystalline material separated by filtration was subjected to distillation to drive overhead material boiling below the boiling temperature of 2,2-bis(4-hydroxyphenyl)propane. The still residue consisted predominantly of crude 2,2-bis(4-hydroxyphenyl)propane having a melting temperature of 153.5° C.

EXAMPLE III

A mixture containing 2-chloropropene and phenol in a mole ratio of 2-chloropropene to phenol of 1:5 to which 0.05 mole of ethyl mercaptan had been added, was stirred for 6 hours while at a temperature in the range of 41 to 52° C. and under a pressure of 2.5 pounds gauge. Hydrogen chloride was bubbled through the reactor contents throughout the operation. The reaction mixture was filtered at room temperature to separate a solid crystalline reaction product therefrom. The separated solid reaction product was distilled to drive off residual unreacted charge and material lower boiling than 2,2-bis(4-hydroxyphenyl)propane. The still residue consisted essentially of 2,2-bis(4-hydroxyphenyl)propane. A conversion to 2,2-bis(4-hydroxyphenyl)propane of 30% and to 2,2-dichloropropane of 22%, based upon 2 - chloropropene charged was obtained. The remainder of the reaction mixture obtained consisted essentially of unconverted charge.

In a repetition of the foregoing operation under substantially identical conditions, but with the exception that no ethyl mercaptan was added to the charge a conversion to 2,2-bis(4-hydroxyphenyl)propane of 32.6% and to 2,2-dichloropropane of 40.2% was obtained.

EXAMPLE IV

A mixture of 2-chloropropene and phenol containing a mole ratio of 2-chloropropene to phenol of 1:4.25 and to which 0.16 mole ethyl mercaptan had been added, was stirred for a period of 3.5 hours at room temperature. Hydrogen chloride was bubbled through the reactor contents throughout the operation. The reaction mixture was distilled to a kettle temperature of 180° C. at 10 mm. The still residue consisted essentially of crude 2,2-bis(4-hydroxyphenyl)propane having a melting temperature of 152° C. Upon recrystallization the melting temperature was found to be 155.5–157.5° C. A conversion to 2,2-bis(4-hydroxyphenyl)propane of 23.2% based on 2-chloropropene charged was obtained.

EXAMPLE V

A mixture of 2-chlorobutene-2 and phenol containing 2-chlorobutene-2 and phenol in a mole ratio of 2-chlorobutene-2 to phenol of 1:5 was stirred for a total period of 7 hours at a pressure of 2.5 pounds gauge. Hydrogen chloride was bubbled through the mixture throughout the 7 hour period. During the first 4 hours of operation the reaction mixture was maintained at room temperature. During the last 3 hours of the run the temperature was progressively increased to a maximum of 65° C. The resulting reaction mixture was distilled to a kettle temperature of 210° C. (20 mm.). The distillation residue obtained consisted of a clear, brown, glass-like solid material comprising 2,2-bis(hydroxyphenyl)butane. A yield of crude 2,2-bis(hydroxyphenyl)butane of 20.6% was obtained based on 2-chlorobutene-2 charged.

Similarly prepared are the gem(hydroxyphenyl)alkanes set forth in the following Table I. The reference numerals listed in the second and third columns of Table I opposite each gem(hydroxyphenyl)alkane identify the similarly numbered compounds in Tables II and III, the interaction of which under the above-defined conditions results in the gem(hydroxyphenyl)alkane.

*Table I*

|  | Identification by Reference Number of Compounds Similarly Numbered in Tables II and III | |
|---|---|---|
| 2,2-bis(2,3-dimethyl-4-hydroxyphenyl)propane | 16 | 1,8 |
| 2,2-bis(2-methyl-5-tert-butyl-4-hydroxyphenyl)propane | 17 | 1,8 |
| 2,2-bis(3-methyl-5-tert-butyl-4-hydroxyphenyl)propane | 18 | 1,8 |
| 2,2-bis(4-hydroxyphenyl)butane | 15 | 2 |
| 2,2-bis(4-hydroxyphenyl)butane | 15 | 3 |
| 3,3-bis(4-hydroxyphenyl)hexane | 15 | 4 |
| 2,2-bis(4-hydroxyphenyl)octane | 15 | 5 |
| 2,2-bis(4-hydroxyphenyl)-3-methylbutane | 15 | 6 |
| 2,2-bis(4-hydroxyphenyl)-3-phenylpropane | 15 | 7 |
| 1,1-bis(4-hydroxyphenyl)cyclohexane | 15 | 9 |
| 2,2-bis(4-hydroxyphenyl)-3-cyclohexylpropane | 15 | 10 |

*Table II*

15 phenol
16 2,3-dimethylphenol
17 2-tert-butyl-5-methylphenol
18 2-methyl-6-tert-butylphenol

*Table III*

1 2-chloropropene
2 2-chlorobutene-1
3 2-chlorobutene-2
4 3-chlorohexene-2
5 2-chloro-octene-1
6 2-chloro-3-methylbutene-1
7 2-chloro-3-phenylpropene-1
8 2-bromopropene
9 1-chlorocyclohexene
10 2-chloro-3-cyclohexylpropene

We claim as our invention:

1. The process for the production of hydroxyphenyl-substituted compounds having the nuclei of two phenolic radicals directly attached to a single carbon atom which comprises reacting an unsaturated organic halide having at least three carbon atoms to the molecule and possessing an olefinic linkage between two carbon atoms of aliphatic character and wherein the non-olefinic bonds of one of the olefinically unsaturated carbon atoms is directly attached to a halogen and a carbon atom with a phenolic compound in an acidic medium.

2. The process in accordance with claim 1 wherein said unsaturated organic halide is an unsaturated organic chloride and said halogen is chlorine.

3. The process for the production of hydroxyphenyl-substituted compounds having the nuclei of two phenolic radicals directly attached to a single carbon atom which comprises reacting an unsaturated organic halide having at least three carbon atoms to the molecule and wherein a halogen atom is attached to an olefinically unsaturated secondary carbon atom with a phenolic compound in the presence of a strong mineral acid.

4. The process for the production of hydroxyphenyl-substituted compounds wherein the nuclei of two phenolic radicals are directly attached to a single carbon atom which comprises reacting an unsaturated halogenated hydrocarbon having at least three carbon atoms to the molecule possessing an olefinic linkage between two carbon atoms of aliphatic character and wherein the non-olefinic bonds of one of the olefinically unsaturated carbon atoms is directly attached to a halogen and a carbon atom with a phenolic compound in an acidic medium.

5. The process for the production of hydroxyphenyl-substituted compounds wherein the nuclei of two phenolic radicals are directly attached to a single carbon atom which comprises reacting an unsaturated halogenated hydrocarbon having at least three carbon atoms to the molecule wherein a halogen atom is attached to an olefinically unsaturated secondary carbon atom with a phenolic compound in the presence of a strong mineral acid.

6. The process for the production of hydroxyphenyl-substituted compounds wherein the nuclei of two phenolic radicals are attached to a single carbon atom which comprises reacting an unsaturated chlorinated hydrocarbon having at least three carbon atoms to the molecule and wherein a chlorine atom is attached to an olefinically unsaturated secondary carbon atom with a phenolic compound in the presence of a strong mineral acid at a temperature of from about 0° C. to about 120° C.

7. The process for the production of bis(hydroxyphenyl)alkanes which comprises reacting a halo-olefin having at least three carbon atoms to the molecule and having an olefinically unsaturated carbon atom directly connected to a halogen and to a saturated carbon atom with a phenolic compound in an acidic medium.

8. The process for the production of bis(hydroxyphenyl)alkanes which comprises reacting a halo-olefin having at least three carbon atoms to the molecule and wherein a halogen atom is attached to an olefinically unsaturated secondary carbon atom with a phenolic compound in the presence of a strong mineral acid.

9. The process in accordance with claim 8 wherein said halo-olefin is a chloro-olefin and said halogen is chlorine.

10. The process for the production of hydroxyphenyl-substituted compounds comprising 2,2-bis(hydroxyphenyl)alkanes which comprises reacting a 2-halo-1-alkene having at least three carbon atoms to the molecule with a phenolic compound with an acidic medium.

11. The process for the production of hydroxyphenyl-substituted compounds comprising 2,2-bis(hydroxyphenyl)alkanes which comprises reacting a 2-halo-1-alkene having from three to 12 carbon atoms to the molecule with a phenolic compound in an acidic medium.

12. The process for the production of hydroxyphenyl-substituted compounds comprising 2,2-bis(hydroxyphenyl)alkanes which comprises reacting a 2-chloro-1-alkene having at least three carbon atoms to the molecule with a phenolic compound in the presence of a strong mineral acid.

13. The process in accordance with claim 12 wherein said strong mineral acid is hydrogen chloride.

14. The process for the production of hydroxyphenyl-substituted compounds comprising 2,2-bis(hydroxyphenyl)propane which comprises reacting 2-halopropene with a phenolic compound in an acidic medium.

15. The process for the production of hydroxyphenyl-substituted compounds comprising 2,2-bis(hydroxyphenyl)propane which comprises reacting 2-halopropene with a phenolic compound in the presence of a strong mineral acid.

16. The process for the production of hydroxyphenyl-substituted compounds comprising 2,2-bis(hydroxyphenyl)propane which comprises reacting 2-chloropropene with a phenolic compound in an acidic medium.

17. The process for the production of hydroxyphenyl-substituted compounds comprising 2,2-bis(hydroxyphenyl)propane which comprises reacting 2-chloropropene with a phenolic compound in the presence of a strong mineral acid.

18. The process in accordance with claim 17 wherein said strong mineral acid is hydrogen chloride.

19. The process in accordance with claim 17 wherein said phenolic compound is phenol and said reaction is executed at a temperature of from about 20° C. to about 80° C.

CARL G. SCHWARZER.
SEAVER A. BALLARD.
DANIEL B. LUTEN, Jr.

REFERENCES CITED

The following references are of record in the file of this patent:

UNITED STATES PATENTS

| Number | Name | Date |
|---|---|---|
| 2,257,201 | Smith et al. | Sept. 30, 1941 |
| 2,315,556 | Soday | Apr. 6, 1943 |